(12) United States Patent
Cheimets et al.

(10) Patent No.: US 6,454,825 B1
(45) Date of Patent: Sep. 24, 2002

(54) EXHAUST BAFFLE FILTER

(76) Inventors: Alex Cheimets, 28 School St., Arlington, MA (US) 02476; Stefano Fioriti, Via Palmiro Togliatti, 19, Sigillo (IT), 06028

( * ) Notice: Subject to any disclaimer, the term of this patent is extended or adjusted under 35 U.S.C. 154(b) by 0 days.

(21) Appl. No.: 09/818,976

(22) Filed: Mar. 27, 2001

(51) Int. Cl.[7] .............................................. B01D 45/08
(52) U.S. Cl. ...................... 55/446; 55/466; 55/DIG. 36
(58) Field of Search ........................ 55/443, 444, 446, 55/466, DIG. 36

(56) References Cited

U.S. PATENT DOCUMENTS

| | | | | |
|---|---|---|---|---|
| 3,870,494 A | * | 3/1975 | Doane | 126/299 D |
| 3,910,782 A | * | 10/1975 | Struble et al. | 126/299 D |
| 4,830,644 A | * | 5/1989 | Gutermuth | 24/545 |
| 5,342,422 A | * | 8/1994 | Wimbock | 55/444 |

* cited by examiner

Primary Examiner—Robert A. Hopkins
(74) Attorney, Agent, or Firm—Morse, Altman & Martin

(57) ABSTRACT

An exhaust baffle filter comprising a frame, a plurality of overlapping upper and lower channels extending between the sides of the frame, and at least one trough at the end of the lower channels. Each upper channel has a ceiling and downwardly-extending walls. Each lower channel has a floor and upwardly-extending walls that vertically overlap the upper channel. The trough has a floor at or below the lower channel floors that is sealed to prevent leakage by liquids. Openings in the lower channel floors allow the grease in the lower channels to drain into the trough.

6 Claims, 3 Drawing Sheets

EXHAUST BAFFLE FILTER

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to kitchen appliances, more particularly, to a stovetop exhaust baffle filter for trapping grease.

2. Description of the Related Art

Above most stovetops is an exhaust fan to vent smoke, combustion gases, grease, and steam away from the work area and to prevent them from collecting in the room. In order to remove grease, a filter is positioned between the stovetop and the fan. Filters of porous materials or loosely bound materials are generally adequate for home use. However, they are inadequate for high volume areas, such as restaurant and some residential kitchens, because the filter gets clogged by grease relatively quickly and must be cleaned often.

Most commercial kitchens and commercial-like residential kitchens use an exhaust baffle filter 100. One form of baffle filter is shown in cross-section in FIG. 2. It has alternating elongated channels 102, 104 that cause the air to flow in an S pattern 106 around the channels 102, 104. As the grease travels from the stovetop to the baffle 100, most of it hits the first channel surface 108 and adheres. The remainder of the grease hits the second channel surface 110 and adheres. The grease adheres because of the nature of liquids to cling to surfaces.

There are two basic ways that the grease is removed from the baffle. In the first, the baffle 100 is positioned on a slant, causing the captured grease to slide down the channels 102, 104 to a slanted gutter, which guides the grease to a holding reservoir. The main shortcoming of this arrangement is that it has two components. With two components, it is typically more expensive and installation is more complicated. Also, the components can be separated and possibly lost by the installer or owner.

The second way grease is removed from the baffle 100 is to position the baffle 100 horizontally, so that the grease collects in the bottom of the second channel 104. Grease that is captured by the first channel 102 slides down the walls 112 into the second channel 104. Every so often, the baffle 100 is removed and emptied. One shortcoming of this method is the potential for spilling the grease every time the baffle 100 is emptied. A second shortcoming is that the grease is held directly over the stovetop and being constantly heated when the stovetop is on. Because grease is flammable, this arrangement is potentially hazardous.

BRIEF SUMMARY OF THE INVENTION

An object of the present invention is to provide an exhaust baffle filter that needs to be emptied less often and that has a lower potential for accidents and loss than those of the prior art.

In short, the present invention is an exhaust baffle filter adapted for use in trapping grease, and that comprises: a frame having a common side; a plurality of upper channels extending between the common side of the frame and other sides of the frame, each upper channel having a ceiling and a pair of upper channel walls, the upper channel walls extending downwardly away from the ceiling at an angle steep enough that the grease will slide down the walls; a plurality of lower channels parallel to the upper channels, each lower channel having a floor approximately parallel to the ceiling and lower channel walls extending away from the floor toward the upper channels and at an angle steep enough that the grease will slide down the lower channel walls to the floor, the lower channels alternating with the upper channels such that the upper channels and the lower channels overlap vertically; at least one trough along the common side of the frame, the trough having a floor at or below the lower channel floors and at least the portion of the trough at and below the lower channel floors being sealed to prevent leakage by liquids; and openings in the lower channel floors to allow the grease in the lower channels to drain into the trough.

The baffle filter of the present invention has a frame with a number of upper and lower channels extending between sides of the frame. The upper channel has a flat ceiling and a pair of downwardly-extending walls, steep enough to allow grease droplets to slide. The lower channel has a floor and a pair of upwardly-extending walls, steep enough to allow grease droplets to slide down to the floor. The upper and lower channels overlap vertically so that grease droplets will fall onto the lower channel from the upper channel walls. As air and suspended grease are pulled into the baffle filter, the larger grease droplets adhere to the upper channel. The flowing air may push the droplets on the ceiling to the wall and the droplets on the wall, finally to drop to the lower channel. Most of the remaining suspended grease droplets adhere to the lower channel.

A trough is located on the frame at one end of the lower channels. In a second embodiment, there are two troughs, one at each end of the lower channels. In a third embodiment, there are two troughs, one at the end of the lower channels and the other at the end of the upper channels, where the upper and lower channels are interchangeable and the filter can be used in either vertical orientation. A fourth embodiment is a combination of the second and third embodiments.

The trough floor is at or below the level of the lower channel floor and is sealed to prevent grease and/or other liquids from leaking from the trough. The normal operating orientation of the baffle filter is slanted, with the trough floor at the lowest point, so that the grease accumulating in the lower channels slides down to the trough. Each lower channel floor has a hole adjacent to the trough to allow the grease to drain into the trough.

Optionally, holes in the upper channels provide access for cleaning.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

Figure 1:
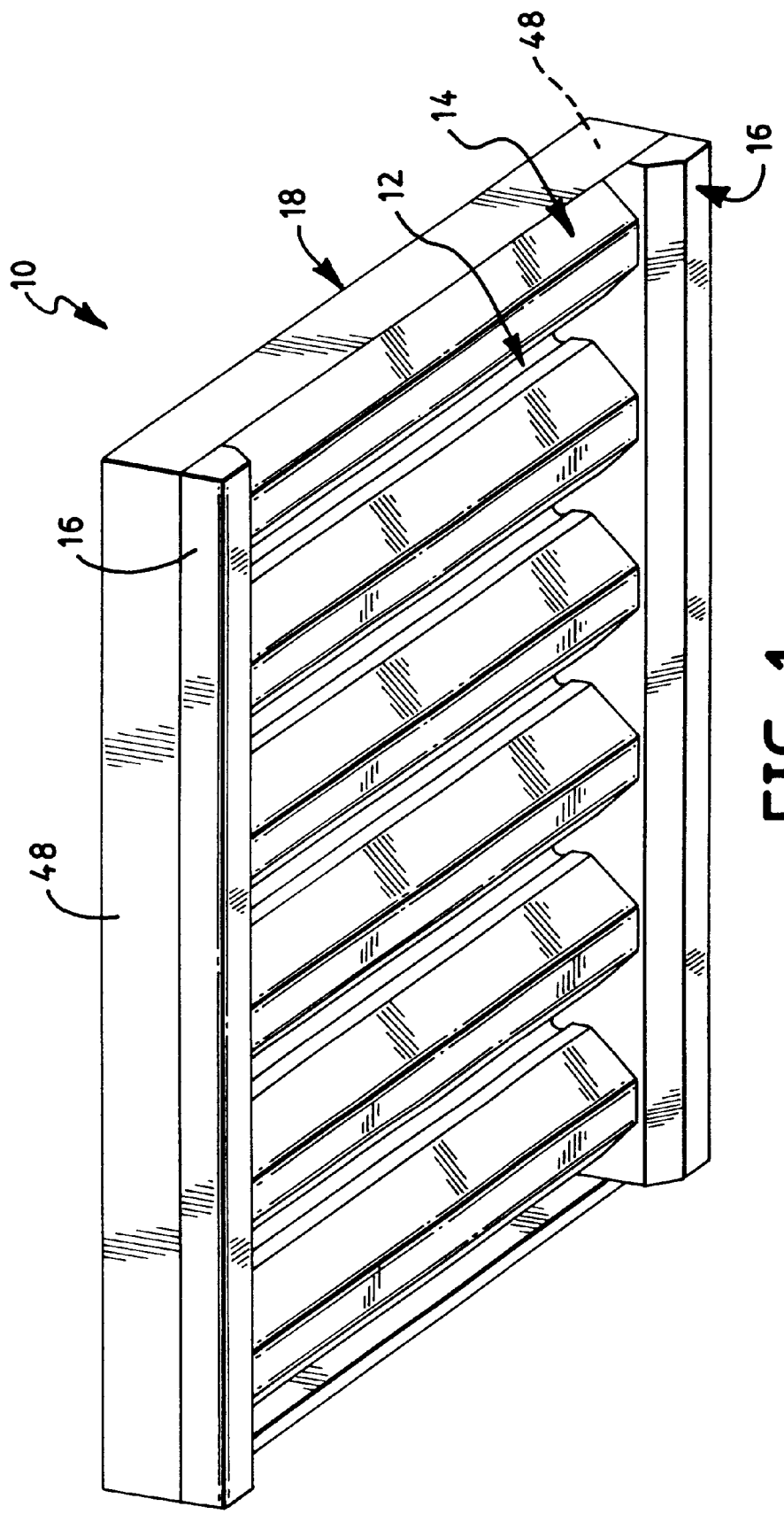
FIG. 1 is a perspective drawing of the exhaust baffle filter of the present invention as viewed from the underside.
Figure 2:
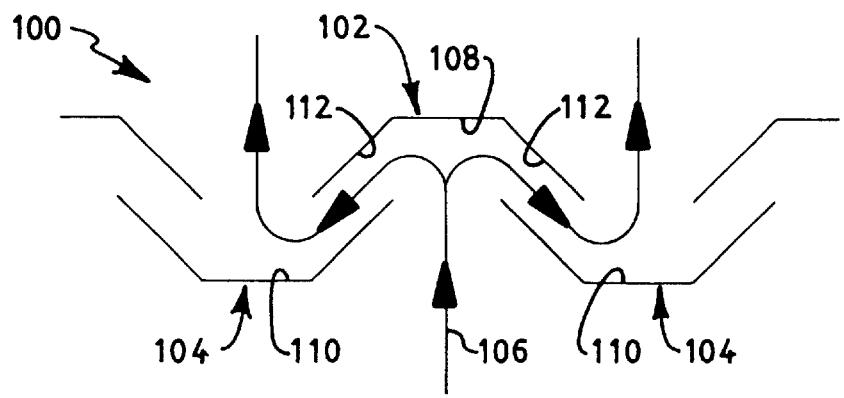
FIG. 2 is a cross-sectional view of a prior art baffle filter.

The exhaust baffle filter 10 of the present invention, shown in FIG. 1, combines a baffle filter with an integral trough for holding the trapped grease.

As used in the present specification, the terms upper, lower, horizontal, and vertical are intended as relative terms in reference to the figures. As discussed below, the baffle filter 10 is mounted at an angle and, in one embodiment, may be flipped over. Thus, horizontal and vertical refer to perpendicular directions rather than to absolute horizontal and vertical. The same is true of upper and lower. In the embodiment that allows the baffle filter to be flipped over, obviously, what was upper is then lower and vice versa.

The baffle filter 10 includes a frame 18 with a number of upper channels 12 and lower channels 14 extending between sides of the frame 18. The channels 12, 14 are all parallel and are oriented in alternating up-down positions. FIG. 1 shows a rectangular frame 18. However, the present invention contemplates that any frame shape can be used in a particular application. All of the channels 12, 14 extend from one common side 48 of the frame 18 to other sides.

Figure 3:
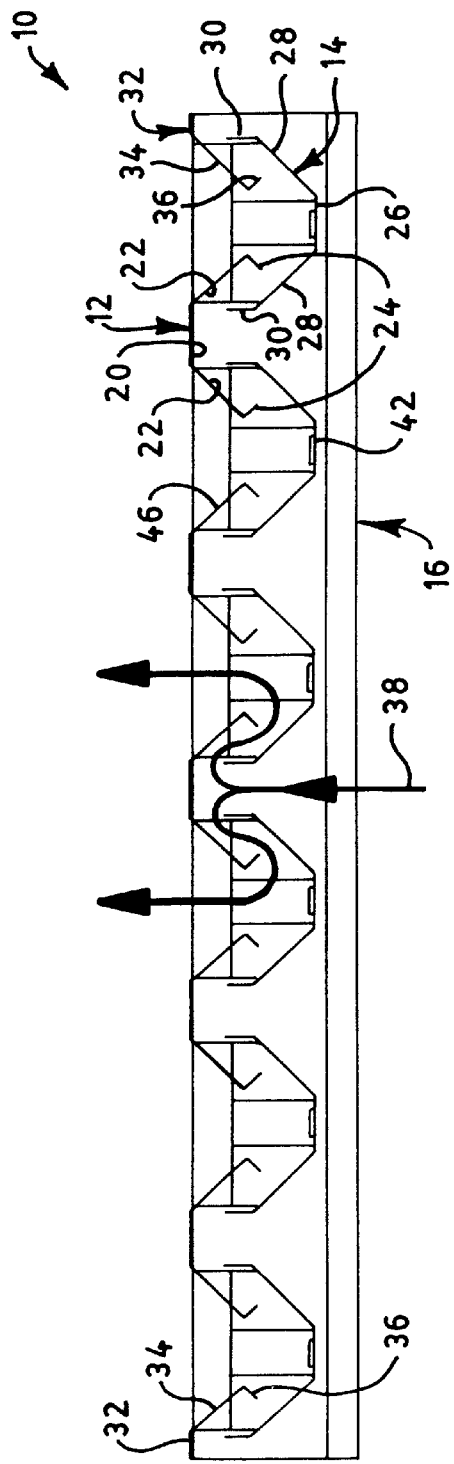
FIG. 3 is a cross-sectional view of the baffle filter of FIG. 1.

In the embodiment of FIGS. 1 and 3, the upper channel 12 has a flat ceiling 20 and a pair of walls 22 extending downwardly at an acute angle relative to the ceiling. The angle of the walls is at least enough to allow grease droplets to slide down the walls 22, and is preferably between 30° and 90°, and most preferably about 45°. Optionally, on the ends of the walls 22 are smaller lips 24 extending inwardly from the walls. The lower channel 14 has a floor 26 that is approximately parallel with the upper channel ceiling 20, and a pair of walls 28 extending upwardly at an angle that is at least enough to allow grease droplets to slide down the walls 28 to the floor 26. Optionally, on the ends of the lower channel walls 28 are smaller lips 30 that extend upwardly. The two outer channels 32 are each one side of an upper channel, with only one wall 34 and one optional lip 36.

Figure 4:
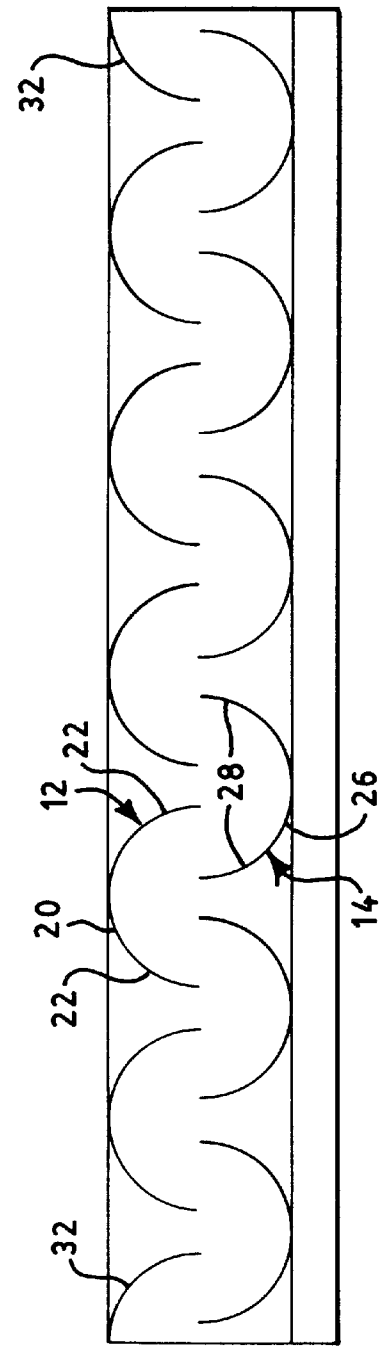
FIG. 4 is a cross-sectional view of an alternate embodiment of the baffle filter of the present invention.

In the embodiment of FIG. 4, the upper channel 12 and lower channel 14 are curved. The angle through which the curve extends is not critical. FIG. 4 shows a 180° curve. Also, the radius of curvature may vary, for example, as an ellipse, or be constant, for example, as a circle, like in FIG. 4. For consistency in terminology, the walls 22 of the upper channel 12 are the two outer portions where the curvature is steep enough that the grease droplets will slide. The ceiling 20 is the center portion that is not part of the walls 22. The lower channel floor 26 and walls 28 are defined in the same manner. The two outer channels 32 are each one half of an upper channel 12.

The upper channels 12 and lower channels 14 overlap vertically. That is, the upper channel walls 22 are within the space of the adjacent lower channels 14 and the lower channel walls 28 are within the space of the adjacent upper channels 12. Horizontally, the channels 12, 14 may or may not overlap. One desired, though not required, characteristic of the relative positions of the channels 12, 14 is that all portions of the upper channel walls 22 be above a portion of a lower channel 14. With this characteristic, any grease droplets are more likely to fall onto the lower channel 14 than onto the stovetop, the latter being a highly undesirable occurrence.

The air flows from bottom to top, as at 38. The air and grease are pulled into the baffle filter, where the air flows sharply around the lower channel lip 30. The turn is too sharp for the larger grease droplets, causing them to strike and adhere to the upper channel ceiling 20 or wall 22. The droplets on the ceiling 20 may be pushed along the ceiling 20 to the wall 22 by the force of the flowing air and the droplets on the wall 22 may be pushed downwardly along the wall 22 by the same means. When there is no lip 24, the droplets may flow around the edge and down the upper surface 46 of the upper channel. If there is a lip 24, it prevents the droplets from reentering the air flow. As the droplets accumulate on the lip 24, they combine to create larger drops, which eventually become heavy enough to fall to the lower channel wall 28. Meanwhile, the air flows around the upper channel 12 toward the lower channel floor 26, where it turns sharply again upwardly. Most remaining grease droplets strike and adhere to the lower channel wall 28 or floor 26.

The trough 16 is located at the common side 48 of the frame 18 at the end of the lower channels 14, and extending across all of the lower channels 14. In another embodiment, there are two common sides 48 with a troughs 16 on each common side 48, as in FIG. 1. Having two troughs 16 allows the baffle filter 10 to be used in either of two horizontal orientations, that is, it can be rotated 180° about a vertical axis. This means that it is less likely that the baffle filter 10 will be installed incorrectly.

In another embodiment, there are two troughs 16 on the same common side 48, but vertically opposed. With this arrangement, the baffle filter 10 can be used in either 180° vertical orientations, that it, it can be flipped over. Again, it means that the baffle filter 10 is less likely to be installed incorrectly.

Finally, the baffle filter 10 can have four troughs 16, two opposed troughs on each of two opposed common sides 48. Having four troughs 16 allows the baffle filter 10 to be used in any of four orientations, combinations of the orientations described above with respect to the two-trough embodiments.

The trough floor 40 is at or below the level of the lower channel floor 26, and most preferably, significantly below the level of the channel floor 26, as in the figures. The portion of the trough 16 at or below the level of the channel floor 26 is sealed to prevent grease or other liquids, such as condensed steam, from leaking from the trough 16 when in its normal slanted orientation above the stovetop and when it is approximately horizontal as when being removed and transported for cleaning.

As indicated, the normal operating orientation of the baffle filter 10 is slanted, with the trough floor 40 at the lowest point. This causes the grease accumulating in the lower channels 14 to slide down the lower channel floors 26 toward the trough 16. A hole 42 in the lower channel floor at end of the lower channels 14 adjacent to the trough 16 allows the grease to drain into the trough 16, as shown in FIG. 3. FIG. 3 shows drain holes that are narrower than the width of the lower channel floor 26 and FIG. 4 shows the drain holes 42 that extends part way up the walls 28. Either is preferred by the present invention.

Figure 5:
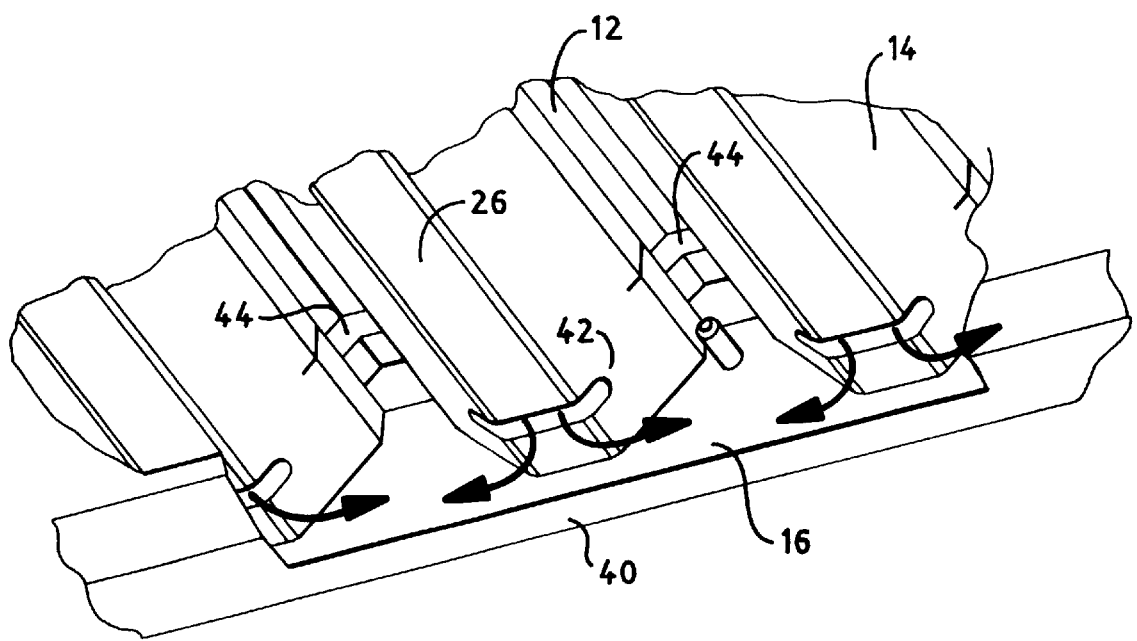
FIG. 5 is a partial cutaway view showing the flow of grease from the channels into the trough.

Optionally, holes 44 at the ends of the upper channels 12, as in FIG. 5, provide access into the upper channels 12 for cleaning. It is contemplated that the baffle filter 10 may be put into an automatic dishwasher for cleaning, and that the holes 44 provide an entry into and/or exit from the upper channels 14, depending on how the baffle filter 10 is placed in the dishwasher, for hot, detergent-laden water for cleaning.

The environment above a stovetop is not very hospitable, with the heat, steam, smoke, particulates, and grease from cooking food. Thus, the material from which the baffle filter 10 is made must be able to withstand the environment for a reasonable period of time, measured in months or years. To these ends, the preferred materials are stainless steel and aluminum. They each have their advantages that are well-known. Stainless steel is more durable, but is heavier and more expensive than aluminum.

Thus it has been shown and described an exhaust baffle filter which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. An exhaust baffle filter adapted for use in trapping grease, said exhaust baffle filter comprising:

(a) a frame having a common side;

(b) a plurality of upper channels extending between said common side of said frame and other sides of said frame, each upper channel having a ceiling and a pair of upper channel walls, said upper channel walls extending downwardly away from said ceiling at an angle steep enough that said grease will slide down said walls;

(c) a plurality of lower channels parallel to said upper channels, each lower channel having a floor approximately parallel to said ceiling and lower channel walls extending away from said floor toward said upper channels and at an angle steep enough that said grease will slide down said lower channel walls to said floor, said lower channels alternating with said upper channels such that said upper channels and said lower channels overlap vertically;

(d) at least one trough along said common side of said frame, said trough having a floor at or below said lower channel floors and at least the portion of said trough at and below said lower channel floors being sealed to prevent leakage by liquids; and (e) openings in said lower channel floors to allow said grease in said lower channels to drain into said trough.

2. The exhaust baffle filter of claim 1 wherein said upper channel walls are completely above said lower channels.

3. The exhaust baffle filter of claim 1 wherein said upper channels include openings for access during cleaning.

4. The exhaust baffle filter of claim 1 wherein said frame includes two opposed common walls, said channels extending between said two opposed common walls, and said filter baffle including a trough on each opposed common wall such that said baffle filter may be used in either of two 180° horizontal orientations.

5. The exhaust baffle filter of claim 1 wherein said common wall includes two opposed troughs such that said baffle filter may be used in either of two 180° vertical orientations.

6. The exhaust baffle filter of claim 1 wherein said frame includes two opposed common walls, said channels extending between said two opposed common walls, and said filter baffle including two opposed troughs on each opposed common wall such that said baffle filter may be used in either of two 180° horizontal orientations and either of two 180° vertical orientations.

* * * * *